United States Patent [19]
Fawzy

[11] Patent Number: 4,701,656
[45] Date of Patent: * Oct. 20, 1987

[54] ELECTROMECHANICAL DEVICE WITH SLOTTED STATOR

[75] Inventor: Moharram M. Fawzy, Malvern, Pa.

[73] Assignee: IntraTechnology Associates, Inc., Malvern, Pa.

[*] Notice: The portion of the term of this patent subsequent to Jul. 10, 2001 has been disclaimed.

[21] Appl. No.: 820,432

[22] Filed: Jan. 17, 1986

Related U.S. Application Data

[63] Continuation-in-part of Ser. No. 629,102, Jul. 9, 1984, Pat. No. 4,565,938, which is a continuation-in-part of Ser. No. 503,914, Jun. 13, 1983, Pat. No. 4,459,501.

[51] Int. Cl.$^4$ ............................................ H02K 21/16
[52] U.S. Cl. ..................................... 310/254; 310/156; 310/164
[58] Field of Search ............... 310/154, 156, 268, 208, 310/218, 254, 164

[56] References Cited

U.S. PATENT DOCUMENTS

| | | | |
|---|---|---|---|
| 2,885,645 | 5/1959 | Wennerberg | 310/44 |
| 3,459,981 | 8/1969 | Dotto | 310/156 |
| 4,410,820 | 10/1983 | Stanley | 310/268 |
| 4,459,501 | 7/1984 | Fawzy | 310/156 |
| 4,565,938 | 1/1986 | Fawzy | 310/156 |
| 4,605,874 | 8/1986 | Whiteley | 310/268 |

*Primary Examiner*—Patrick R. Salce
*Assistant Examiner*—D. L. Rebsch
*Attorney, Agent, or Firm*—John S. Munday

[57] ABSTRACT

An electromechanical device which can be used as a motor or as a generator. The device has a housing, including bearing means to support a rotatable shaft. Disc magnet means are provided, and poled to have alternating polarity and are mounted on the shaft to define a rotor.

The device is an improvement in those which include at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. The improvements include a plurality of slots in the toroid stator core which are of sufficient depth to accommodate the windings on the stator, so as to eliminate any air gap caused by said windings between the pole shoes and the stator. Another improvement is the use of segmented cores for ease of assembly. Another improvement is achieved by forming the pole shoes in a skewed direction by an angle of from less than 1° up to 20° from the radial axis.

7 Claims, 3 Drawing Figures

ELECTROMECHANICAL DEVICE WITH SLOTTED STATOR

BACKGROUND OF THE INVENTION

This is a continuation-in-part of co-pending U.S. patent ppplication having Ser. No. 629,102, filed July 9, 1984, now U.S. Pat. No. 4,565,938, which in turn is a continuation-in-part of a co-pending U.S. patent application having Ser. No. 503,914 and filed June 13, 1983, for a Toroidal Generator and Motor with Radially Extending Magnetic Poles, now U.S. Pat. No. 4,459,501.

This invention relates to an improvement in an electromechanical device which can be used as a generator, electric motor, and other types of magnetic rotating components including polyphase generators and motors, steeper motors, brushless motors and the like. Because of the design, these device are admirably suited for use where flat or "pancake" designs are used.

Many electromechanical devices have been designed heretofore with varying efficiencies and ability. When size and shape are of no concern, motors and generators which utilize electrical power can be built for almost any purpose with good success. This is particularly true when the mass of the device is not considered. Difficulties and inefficiencies occur when other criteria, such as size, shape, cost, etc. are incorporated into the design.

One such example of where design requirements place a burden on the motor is disclosed in U.S. Pat. No. 4,225,798 to Barrett. In Barrett, a long thin motor is disclosed which is suitable for operating automobile window opening and closing apparatus mounted in a hollow door of the vehicle. As is taught therein, considerations of space, weight and configuration have caused conventional motor design to be inadequate, particularly if they are of the common cylindrical construction. The inadequacy of cylindrical motors is clearly taught in Barrett. Another example of disadvantages of cylindrical design, when the length of the cylinder is shortened is shown in U.S. Pat. No. 4,283,647 to Herr et al. Leakage is obviously a major problem.

To obviate the design limitations show therein, Barrett has proposed a design which includes a structure having at least two permanent magnets and at least two field shoes. Each field shoe has an arcuate surface which forms one side of an air gap between the shoe and the armature. The field show has thickness and crossectional area which varies substantially in proportion to the density of magnetic flux carried by the shoe. Also the air gap is varied by constructing the shoe in a nonconcentric shape. The preferred design includes two magnets and shoes, and is reported to be a powerful motor for its given size and weight. The design requirements call for a number of shaped parts for close tolerance and cooperation during the operation of the motor.

Another electromechanical machine of a flat or "pancake" design is disclosed in U.S. Pat. No. 4,188,556 to Hahn, which teaches the use of flat stator members having a circular array of magnets arranged in a suitable manner. Nevertheless, to increase power it is necessary to increase the number of magnets, thus increasing cost, weight and construction difficulties.

Other "pancake" motors which have significant power limitations are described in U.S. Pat. No. 3,315,106 to Reyst et al. In Reyst et al, the difficulties incurred with the use of printed circuit rotor discs are set forth. Reyst et al suggests the use of laminated rotors to overcome the limitations of printed circuits. U.S. Pat. No. 3,348,086 to Monma discloses another flat motor, in which flat coils are arranged on the core in a specified manner. Another such patent, which uses permanent magnet stators, is U.S. Pat. No. 3,469,133 as does the design taught in U.S. Pat. No. 3.904,902, in U.S. Pat. No. 3,993,920 and in its related U.S. Pat. No. 4,143,288.

U.S. Pat. No. 2,914,688 discloses a unipolar electric motor in which the magnets are fixed along a rotor shaft and are arranged so that the north and south poles are displaced radially from each other.

Patents in which the flux guides are adjacent radial faces of the magnetic means are U.S. Pat. No. 4,388,545 and U.S. Pat. No. 3,849,682, where the latter was cited in the original parent application identified above.

Cited in the second parent application above is U.S. Pat. No. 3,906,267, which employs a single permanent magnet.

U.S. Pat. No. 3,535,566, to Smith, discloses a construction which used induced eddy currents on a rotor, but it is not clear that permanent magnet means could be employed without a significant redesign of the device.

Nevertheless, none of the above or other patents teach that a motor or generator can be designed which optimized the ratio of the active length of a winding turn, or which permits addition of virtual poles without resorting to addition of actual magnets to reduce the core size needed for a given performance. Accordingly it is an object of this invention to provide an electromechanical device which is of high efficiency and power with low cost and without intricate or complicated design. It is an object to create a motor/generator using one or two disc magnets yet having the ability to increase the number of virtual poles.

SUMMARY OF THE INVENTION

The foregoing and additional objects are achieved in accordance with the principles of this invention as follows. An electromechanical device useful as a motor or as a generator is provided, having a housing shaped as desired. In the housing bearing means are provided to support a rotatable shaft which can be connected to whatever equipment the device is to be used with.

Disc magnet means are magnetized, and are mounted on the shaft to define a rotor. Also associated with each magnet means, is at least one first pole shoe, in contact with the first polarity poles of the disc magnet means, and having portions extending radially from the face to define a pair of virtual pole chambers of the first polarity. One feature of this invention includes forming these shoes in a skewed fashion. At least one second pole shoe is provided in contact with the disc magnet means and has portions extending radially to define similarly a pair of virtual poles of the second polarity. This second pole shoe is also formed in a skewed fashion. A toroid stator is mounted on the housing, and has toroidal windings thereon which are contained in slots. The stator or toroid which may be segmented in one embodiment, is positioned annularly around the disc magnets such that the first and second pole shoes surround portions of the windings with alternating fields of polarity and mounted via means attached to the face of the toroid and to the opposing face of the housing. Up to 96% of the active winding may be enclosed by the shoes. Means for electrical contact with the stator, of conventional design to either supply current in the generator configuration or receive current in the motor mode, are provided.

In one preferred embodiment, the disc magnet means comprises a single disc magnet with each face poled in opposite polarity. Thus the pole shoes contact one face to define one virtual pole chamber or the other face to define the other pole chamber.

In another embodiment, a pair of disc magnets are poled to have opposite polarity on their faces and are positioned to have faces of a first polarity facing one another, so that the faces of the second polarity are facing outward. The first pair of pole shoes is positioned to contact both of said two inner disc magnet faces which are facing each other and each has a portion which extends radially in a skewed fashion to define a uniquely shaped pair of virtual pole chambers of this first polarity. A pair of second pole shoes are positioned so that each will contact one of the two outer faces of the disc magnets and has a portion which extends radially in a skewed fashion to define a pair of uniquely shaped virtual pole chambers of the same polarity as this second or outer pair of disc magnet faces. By providing at least two first pole shoes and at least two second pole shoes, the number of virtual poles of alternating polarity which surround the toroid can be doubled. More pairs of pole shoe extensions will permit the number of virtual poles to be increased to any desired number without adding any new magnets. This change in the number of virtual poles without change in the number of magnets is a great advantage and provides much versatility for these motors and generators, and can be accomplished even when only one disc magnet is used.

The axis of the radially extending portion of each pole shoe is offset from a true radial orientation by a small angle of skew, $\theta$, which may be less than 1° to more than 1°. This skew angle serves to reduce the magnetic cogging that is otherwise associated with the edges of the pole chamber being in radial coincidence with the stator slots.

The most preferred configuration for the first pole shoe includes a flat portion which covers the face of the disc magnets which is facing inward and a pair of cup portions which define a chamber sized to accept the toroid. The additional first pole shoe for the other inward facing portion of the other disc magnet cooperatively defines a chamber whereby the toroid is totally encircled, except for allowance for toroid mounting by a virtual pole of the same polarity as the two faces of the magnets. Each of the magnets has a second pole shoe covering the outward face and having a cup portion which cooperates with the other second pole shoe to define a chamber surrounding the toroid as in the first pole shoe. These two chambers are each designed to be adjacent to 100% of the length of winding on the toroid, exclusive of the allowance for mounting the toroid. Closure means are used to substantially enclose the stator.

BRIEF DESCRIPTION OF THE DRAWINGS

The foregoing and other objects of this invention and the particular feature of various embodiments will be more clearly understood from the following detailed description thereof, when read in conjunction with the accompanying drawings, in which.

DETAILED DESCRIPTION OF THE INVENTION

Figure 2:
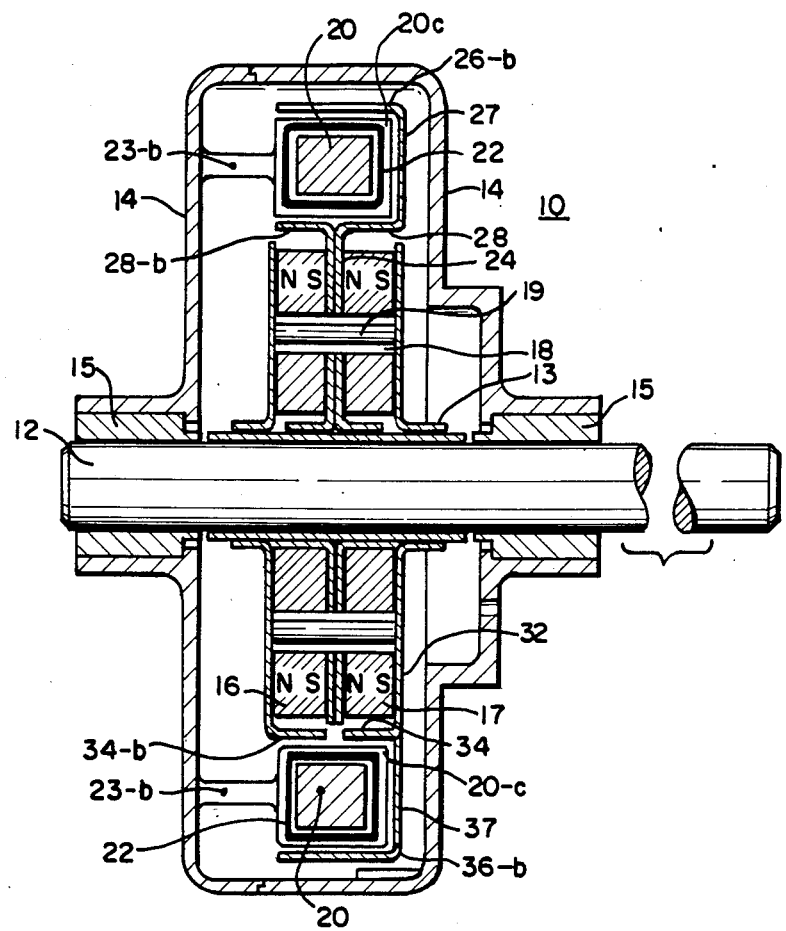
FIG. 2 is a partially sectioned view of an entire device according to an embodiment using two magnets.

Referring now to the drawings wherein like elements in different figures thereof have the same reference character applied thereto, an electromechanical device useful as a motor or as a generator is designated by the reference numeral 10. In FIG. 2, a shaft 12 is fitted with mounting sleeves 13 inside housing 14. Bearings 15 are porvided to support rotation of shaft 12. A pair of disc magnets 16 and 17 are poled to have opposite polarity on the faces, and are mounted on shaft 12 to define a rotor. Two south polarity faces S of magnets 16 and 17 are positioned facing each other so that the outer faces have north polarity N. An alignment bushing 18 provides a location for fastening bolts through the holes defined by axis 19.

Figure 3:
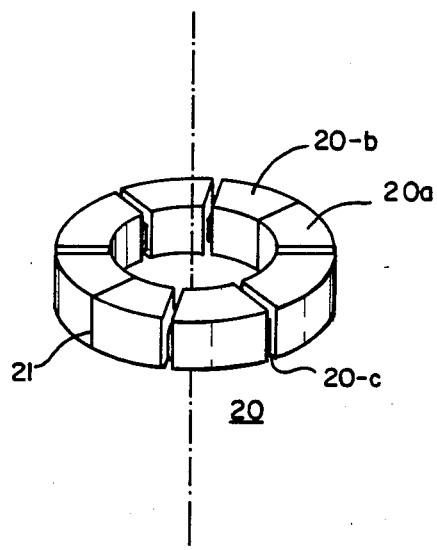
FIG. 3 is a perspective view showing one embodiment of the segmented toroidal core with slots.

The stator core 20 is preferably of the construction shown in FIG. 3 and is of a segmented toroidal construction. For ease of construction and winding, as well as for ease of repair, the core 20 may be made of two halves 20a and 20b which are fastened together at the junction 21. This junction 21 can be permanent, such as by welding or permanent bonding, or it can be made using mechanical or otherwise detachable means. Slots 20c are cut in the toroid 20 in a direction which extends radially from the axis of thr toroid 20. These radial slots are sized to include the windings within the outer periphery of the surface of the core.

The toroid stator core 20 of FIG. 3 is fitted with these toroid windings 22 as seen in FIG. 2 and are themselves of conventional construction. The core is mounted to housing 14 via mounting means 23a to form the stator. Mounting means 23b are attached to the face of the toroid stator core 20 and the opposing face of housing 14. As will be explained herein, a first pole shoe 24 contacts the south polarity face of the magnet 17 and has a portion extending radially away from magnet 17 to define a cup shaped virtual south pole as described by members 26b, 27, 28 and 28b. Similarly pole shoe 32 contacts the outer or north polarity face of magnet 17 and extends radially from magnet 17 to define a pair of north polarity virtual poles at 34, 36b and 37. The toroid stator core 20 is positioned annularly around magnets 16 and 17 so that first pole shoe 24 and second pole shoe 32 surround portions of the windings 22 with alternating south and north polarity from the virtual poles. Means are provided for electrical contact with the stator, of conventional design such as in mounting means 23b, to permit flow of current into or out of the device as it operates as a motor or a generator. Similarly, a second set of shoes are positioned around magnet 16 and serves to complete the inner sides of the south and north chambers as shown.

Figure 1:
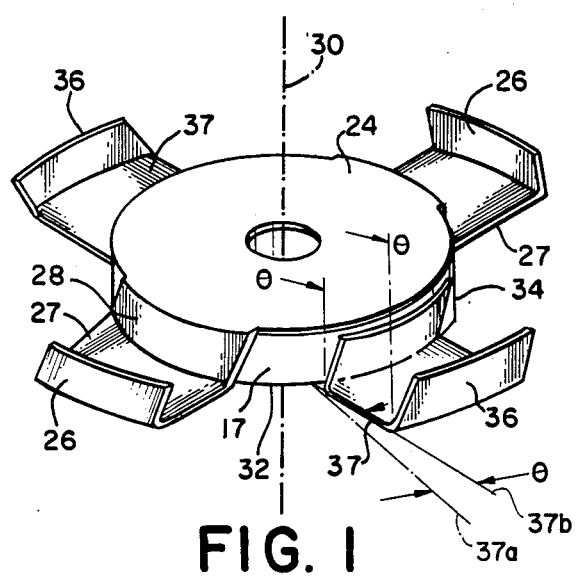
FIG. 1 is a perspective view of part of the preferred embodiment using a single magnet.

In a preferred embodiment, the disc magnet means is a single disc magnet having a north pole on one face and a south pole on the other face. FIG. 1 shows a single magnet 17 (with polarity not shown) in which first pole shoe 24 contacts a first polarity face of the magnet 17. The pole shoe 24 has a portion extending radially away from the magnet 17 to define the virtual pole. Similarly pole shoe 32 contacts the second polarity face and has a portion extending radially away to define the other virtual pole.

The design of the pole shoes and their relationship is shown in FIG. 1. A disc magnet 17 has one face of one polarity covered with a first pole shoe 24, which has extended radially from the magnet an outer edge 26, cavity 27 and inside edge 28. The edge 26, cavity 27 and inside 28 define a chamber into which the toroid stator core 20 is place. Similarly, the second pole shoe has a face 32 in contact with the outside or other face of magnet 17, thereby having opposite polarity. Pole shoe outside edge 36, interconnecting edge 37 and inside edge 34, define a chamber of opposite polarity, thereby providing alternating north and south virtual poles in dynamic relationship with the stator 20.

As shown in FIG. 2, which is partial section view, a typical magnet with its pole shoes and cavity forming edges can be visualized. Thus, in FIG. 2, pole shoe 24 surrounds toroid 20 at the top thereof via outside edge 26b, interconnecting edge 27 and inside edges 28 and 28b. The chamber substantially surrounds toroid 20 such that nearly all of the winding is within the field and is electrically active, except for a space for mounting the toroid.

In the lower portion of FIG. 2, pole shoe 32 with outside edge 36b, interconnecting member 37 and inside edge 34 defining a cavity in the same manner. Again, the toroid 20 is nearly completely surrounded by the virtual north pole cavity.

In all of the embodiments, the windings 22 are within the slots 20c of toroid core 20, so that the air gap between the stator 20 and the pole shoes, such as at 27 or 37 is not increased because of the presence of windings 22. Substantial efficiencies and economies are achieved in this manner.

An additional embodiment shown in FIG. 1 is provided to prevent or at least minimize cogging, which can occur when the slot 22c and pole shoes pass in relative rotation. A skew angle, shown as $\theta$ in FIG. 1, indicates that the radially extending parts of the pole shoes are skewed so that, for example, edges 37b are offset from true radial orientation 37a by angle $\theta$, which is small but can range from less than 1° to as much as 20° or more. The specific angle $\theta$ will be determined by the speed and size of the motor, as well as other factors which affect magnetic cogging that may be associated with the device.

It is understood that the above embodiments are merely illustrative of the application of the principles of this invention. Numerous other embodiments may be devised by those skilled in the art without departing from the spirit and scope of theis invention as defined by the appended claims.

I claim:

1. In an electromechanical device having a housing, including bearing means supporting a rotatable shaft, a magnetized disc magnet means, at least one first pole shoe positioned to contact said magnet means at a first polarity and having portions extending radially outward to define a pair of virtual pole chambers of said first polarity, at least one second pole shoe positioned to contact said magnet means at a second polarity and having portions extending radially outward to define a pair of virtual pole chambers of said second polarity, and a toroid stator mounted on said housing and having windings thereon, said stator being positoned annularly around said disc magnet means such that the virtual poles surround portions of said windings with alternating fields of polarity, the improvement comprising:
a plurality of slots in said toroid stator of sufficient depth to accommodate said windings to reduce the air gap between said pole shoes and said stator.

2. The device of claim 1 wherein said stator is segmented for assembly.

3. The device of claim 1 wherein the radially extending parts of said pole shoes are skewed from a radial axis by an angle of from 1° to 20°.

4. In an electromechanical device having a housing, including bearing means supporting a rotatable shaft, a magnetic disc magnet means, at least one first pole shoe positioned to contact said magnet means at a first polarity and having a pair of cup portions extending radially from the periphery of said magnet means to define a pair of virtual pole chambers of said first polarity and sized to accept a toroid stator, at least one second pole shoe positioned to contact said magnet means at a second polarity and having a pair of cup portions extending radially from the periphery of said magnet means to define a pair of pole chambers of said second polarity and sized to accept a toroid stator, and a toroid stator mounted on said housing and having windings thereon, said stator being positoned annularly around said disc magnet within said pairs of cup portions such that the virtual poles surround portions of said windings with alternating fields of polarity, lthe improvement comprising:
a plurality of slots in said toroid stator of sufficient depth to accommodate said windings to reduce the air gap between said pole shoes and said stator.

5. The device of claim 4 wherein said stator is segmented for assembly.

6. The device of claim 4 wherein the radially extending parts of said pole shoes are skewed from a radial axis by an angle from 1° to 20°.

7. The device of claim 4 wherein said magnet means includes a single disc magnet having faces with opposite polarity.

* * * * *